United States Patent [19]

Pöschl et al.

[11] Patent Number: 5,584,322

[45] Date of Patent: Dec. 17, 1996

[54] ROTARY SLIDE VALVE

[75] Inventors: Günter Pöschl, Schwaikheim; Detlev Degenhardt, Lübeck, both of Germany

[73] Assignee: PPV Verwaltungs AG, Zurich, Switzerland

[21] Appl. No.: 553,653

[22] PCT Filed: May 28, 1994

[86] PCT No.: PCT/EP94/01746

§ 371 Date: Nov. 29, 1995

§ 102(e) Date: Nov. 29, 1995

[87] PCT Pub. No.: WO94/27708

PCT Pub. Date: Dec. 8, 1994

[30] Foreign Application Priority Data

Jun. 1, 1993 [DE] Germany ............ 43 18 203.8

[51] Int. Cl.[6] .................................................. F16K 11/06
[52] U.S. Cl. ................. 137/625.46; 96/124; 137/624.13
[58] Field of Search ..................... 137/624.13, 625.46; 96/116, 124

[56] References Cited

U.S. PATENT DOCUMENTS

| 4,038,054 | 7/1977 | Graff | 96/124 |
| 4,272,265 | 6/1981 | Snyder | 137/625.21 X |
| 4,968,334 | 11/1990 | Hilton | 137/625.47 X |
| 5,071,453 | 12/1991 | Hradek |  |
| 5,112,367 | 5/1992 | Hill | 96/124 X |
| 5,256,174 | 10/1993 | Kai et al. | 96/124 X |

FOREIGN PATENT DOCUMENTS

| 0525521 | 7/1992 | European Pat. Off. . |
| 0512534 | 11/1992 | European Pat. Off. . |
| 2214662 | 10/1973 | Germany . |
| 1544036 | 12/1977 | Germany . |
| 3238969 | 4/1984 | Germany . |
| 2556097 | 4/1986 | Germany . |
| 2033777 | 5/1980 | United Kingdom . |
| 2190014 | 11/1987 | United Kingdom . |

*Primary Examiner*—Gerald A. Michalsky
*Attorney, Agent, or Firm*—Alfred Stapler; Lipton & Stapler

[57] ABSTRACT

A rotary slide valve (10) controls compressed air, nitrogen and oxygen streams independently from each other. The rotary slide valve (10) consists of a housing (15) with pairs of diametrically opposed radial bores and a valve body (11) with recesses (35, 37). The valve body (11) is coupled to a rotary drive R. According to its position, the valve body (11) opens and closes compressed air inlets, compressed air outlets or nitrogen outlets and controls the streams of compressed air and nitrogen. In addition, the rotary slide valve controls several streams of oxygen through several axial oxygen inlets (49, 51) and outlets (53, 55) which may be interconnected through an axial recess of the valve body (11). The rotary slide valve (10) is used in particular in air oxygen-enriching installations.

17 Claims, 8 Drawing Sheets

Phase 5  Fig. 3e

Phase 6  Fig. 3f

Phase 7  Fig. 3g

Phase 8  Fig. 3h

ROTARY SLIDE VALVE

TECHNICAL FIELD

The invention relates to a rotary slide valve.

PRIOR ART

Such a rotary slide valve is already known from DE-OS (German Patent Publication) 25 56 097 and is utilized as the control mechanism in an adsorptive pressure exchange process, which is used for the oxygen enrichment of air. Two containers, each containing a zeolite fixed bed, are alternately supplied with air under pressure, so that the zeolite fixed bed in the currently connected container adsorbs the oxygen present in the compressed air, so that oxygen enriched air leaves this zeolite fixed bed. While the container which is connected produces oxygen enriched air, the other container is disconnected and the gas which is retained in the zeolite fixed bed is desorbed. A desorption is necessary because the adsorptive capacity of a zeolite fixed bed is limited, so that a desorption phase must proceed after an adsorption. The known rotary slide valve controls the desorption of the zeolite fixed bed in such manner that, in addition to being disconnected, the zeolite fixed bed is scavenged by the introduction of produced oxygen enriched air and the nitrogen which has been deposited on the zeolite fixed bed is liberated. The known rotary slide valve controls the introduction of the compressed air, the withdrawal of the liberated nitrogen as well as the supply of oxygen enriched air as scavenging air. To this end, the rotary slide valve consists of four control plates having numerous grooves and bores. The disadvantage of this known rotary slide valve resides on the one hand in the complicated and expensive arrangement of several consecutively connected control plates having complicated groove shapes. On the other hand, it is especially disadvantageous that the yield of oxygen enriched air is substantially reduced by the quantity of diverted scavenging air.

From DE-AS (German Patent Publication) 15 44 036 there is known an apparatus for the selective adsorption of gas components in which containers filled with adsorption material are alternately hooked-up by a flat slide valve control. This flat slide valve control consists of two pairs of perforated plates, each pair consisting of one stationary and one rotating perforated plate. In contrast to rotary slide valves, which have a cylindrical component that rotates inside a housing and which has recesses for the control of gas flows in the outer and casing surface, a flat slide valve control consists of exceptionally smooth perforated plates superposed on each other and having grooves or lead-through bores in their top and bottom surfaces. Between the two perforated plate pairs there are located two containers filled with adsorption material, which serve to take up moisture present in air. Both containers are connected to the rotatable perforated plates and are rotated by a driving means. Depending on the positioning of the perforated plates, there occurs adsorption or desorption in the containers, the desorption involving in this case a drying of the containers. The stationary perforated plates have two control slots, each in the shape of an arc of a circle. Because one control slot extends over more than 180°, an adjustment is possible in which both containers adsorb simultaneously. This extends the duration of the adsorption phase relative to the desorption phase. Therefore this flat slide valve can be used only for processes in which water vapor is separated from the air, because only in such processes is it possible to desorb the adsorption material in the shortest possible time through the introduction of air at very high temperatures. For adsorption materials such as, for example, zeolite in fixed beds, in which rapid desorption is not possible, this known flat slide valve cannot be used, because it would lead to incomplete desorption of the zeolite fixed beds. It is also a drawback of this known apparatus that not only two perforated plates but also the containers located between them must be rotated. For large, heavy containers this apparatus is therefore scarcely useable.

Another apparatus for the selective adsorption of gas mixtures using a flat slide valve control is known from DE (German Patent) 32 38 969 A1. This flat slide valve control consists, among other things, of a stationary and a rotatable control plate. The stationary control plate is connected through appropriate bores and ducts to in- and outlets of several alternately adsorbing containers. The control plates have a plurality of grooves and bores, by means of which the adsorption and desorption phases of the containers are controlled, depending upon the positioning of the rotatable plate. In addition, bores are provided which make it possible to carry out, between the desorption and the adsorption phase, a pressure rise or an additional scavenging process inside the currently desorbing container, in that oxygen enriched air under pressure from an intermediate container is allowed to flow into the currently desorbing container. This known flat slide valve control is very expensive because of the numerous grooves and bores of the intermediate storage means and because of numerous check valves intended to prevent the outflow of oxygen enriched air from an additional storage vessel for the produced gas.

From EP (European Patent) 512 534 A1 there is also known apparatus for the selective adsorption of gas mixtures using a flat slide valve control. In this, a cylindrical container filled with adsorption material is subdivided into several separate segments which alternately go through adsorption and desorption phases. In so doing, the flat slide valve controls two gas streams for each segment by means of appropriate bores and grooves through stationary and rotatable control plates. The disadvantage of this apparatus is that the desorption is effective only if pure product gas is used because, if a gas mixture is used which still contains components to be adsorbed, those would still be present in the pipes, bores, and grooves of the apparatus after the desorption phase is complete, so that, in the subsequent adsorption phase, the pure product gas obtained, which flows through these same pipes, bores and grooves, would be contaminated. If product gas is used for desorbing, i.e. scavenging of the segments, the yield of product gas is reduced and if a gas mixture is used which contains components to be adsorbed, the degree of purity of the product gas is diminished.

In GB (United Kingdom) Patent 21 90 014 A there is contemplated an apparatus for the adsorption of gas components using two alternately operating zeolite containers, in which there are present two rotary slide valves which control gas in-flow, out-flow and scavenging process. The two rotary slide valves are connected to a common rotary drive. A drawback of this apparatus is not only that two rotary slide valves plus a check valve, to prevent back flow of product gas into the ducting, leads to enhanced manufacturing costs but that, as in EP 512 534 A1, only product gas is appropriate for scavenging since otherwise, when using a gas mixture having components to be adsorbed, this gas remains after the desorption phase in the ducting of an upstream rotary slide valve and can get into the product gas during the adsorption phase.

From GB (United Kingdom Patent) 20 33 777 A there is known an expensive apparatus for separating oxygen and nitrogen from air. In it the gas streams are directed out of and into eight containers filled with adsorption material through a common flat slide valve. In so doing, the containers are connected partly in series and a costly procedure for desorption of the containers is provided. In one phase, the containers are connected for that purpose to a vacuum source and in another phase, pure nitrogen is additionally introduced into the containers in order to scavenge remaining oxygen from the container. This known apparatus with flat slide valve is very expensive.

U.S. Pat. No. 5,071,453 discloses an apparatus for producing oxygen enriched air using two alternately operating molecular beds which are alternately supplied with compressed air through a simple rotary slide valve. For desorption, newly produced product gas is introduced into the molecular bed which is currently to be desorbed. This known apparatus is intended to produce oxygen enriched air for the crew of an airplane, and the apparatus produces oxygen enriched air especially in emergency situations at high altitude.

U.S. Pat. No. 5,112,367 also discloses apparatus for producing oxygen enriched air using several zeolite fixed beds, which are supplied with compressed air through a rotary slide valve, in which the product gas is introduced into a product gas storage vessel. In the desorption phase, product gas is taken from this storage vessel to scavenge the zeolite fixed beds. In so doing the known rotary slide valve directs the supplied compressed air stream and the gas stream flowing from the zeolite fixed beds to scavenge the fixed beds.

DESCRIPTION OF THE INVENTION

The object of the invention is to provide a rotary slide valve such that it can control the opening and closing of a plurality of gas conducting ducts using the fewest possible moving parts and, when used in an oxygen enriching apparatus, it prevent contamination of oxygen enriched air, so that the apparatus delivers an increased yield of oxygen enriched air.

This object is achieved in accordance with the invention.

By virtue of the fact that the rotary slide valve according to the invention includes at least two openings serving exclusively as oxygen inlet openings and two corresponding oppositely located openings serving exclusively as oxygen outlet openings, complete control of the outflow of oxygen enriched air becomes possible. Because the rotary slide valve according to the invention has all the openings and recesses for controlling the compressed air and the nitrogen flows in peripheral surfaces of the rotary slide valve and all of the openings and recesses for controlling the oxygen flows in end faces, the oxygen flows are clearly separated spatially from the remaining gas flows, so that leakages which would lead to contamination of the produced oxygen are prevented. Should sealing defects arise at the peripheral surfaces of the slide valve body and the housing, there remain the closely adjoining end faces of slide valve body and housing, which prevent the inflow of compressed air or nitrogen into the oxygen-conducting recesses and openings.

Oxygen streams independently of compressed air and nitrogen streams.

In contrast, in the known rotary slide valve according to DE-OS (German Patent Publication) 25 56 097 it is only possible to control an oxygen stream to a limited extent. The known rotary slide valve has two openings, both of which are simultaneously either open or closed. This has the purpose, in apparatus for the oxygen enrichment of air which functions with two alternately operating containers, of short-circuiting the flow of produced oxygen enriched air, in order to achieve pressure equalization.

In the known flat slide valve according to EP (European Patent) 05 12 534 A1 there are indeed provided several bores and grooves which control the in-flow of a gas mixture to be separated and the out-flow of product gas as well as the in-and out-flow of gas which is used for scavenging, but these bores and grooves control several gas streams alternately. This leads to the previously described drawback that the impure scavenging gas remains in the holes and grooves after the desorption phase, if pure product gas is not used for scavenging, which contaminates the outflowing pure product gas in the subsequent adsorption phase, which then flows out through the same bores and grooves. Furthermore, the rotary slide valve according to the invention also controls separately the flows of the product gas, and the oxygen outlet openings are not also used as control openings for scavenging gas or for the compressed air which is to be separated. Thus an increased degree of purity of the product gas is achieved in a simple manner.

The rotary slide valve is part of an apparatus for the oxygen enrichment of air through selective adsorption of air components using at least two alternately operating containers filled with adsorption material. In so doing, the rotary slide valve controls all of the compressed air flows, nitrogen flows and flows of oxygen enriched air. In the rotary slide valve according to DE-OS (German Patent Publication) 25 56 097 and the apparatus according to DE (German Patent) 32 38 969 A1 there are provided in each case several check valves at the inlets to a storage vessel for the produced gas, in order to prevent a reverse flow of produced gas. By use of the rotary slide valve according to the invention, these check valves are no longer needed, because the oxygen inlet openings of the rotary slide valve are connected to the container outlets and the oxygen outlet openings of the valve are connected to an oxygen storage vessel. Because the rotary slide valve according to the invention is located between the containers and the oxygen storage vessel, it itself operates as the check valve. Therefore, when using the rotary slide valve according to the invention in an apparatus for the oxygen enrichment of air, the zeolite fixed beds are not desorbed by oxygen enriched produced air. The entire oxygen enriched air is introduced into the oxygen storage vessel without any part of the produced oxygen enriched air being diverted for desorption. Thus the yield of oxygen enriched air is substantially enhanced through use of the rotary slide valve according to the invention.

Especially for large containers, there can also be provided additional low pressure ducts through which nitrogen can be removed from portions of the containers which are poorly desorbed due to their distance from the compressed air outlet openings. To prevent undesired flow-through of compressed air during adsorption, check valves can be provided in the low pressure ducts.

BRIEF DESCRIPTION OF THE DRAWINGS

Illustrative embodiments of the invention are described in more detail in what follows with reference to the drawings. There are shown in.

PREFERRED EMBODIMENT OF THE INVENTION

Figure 1A:
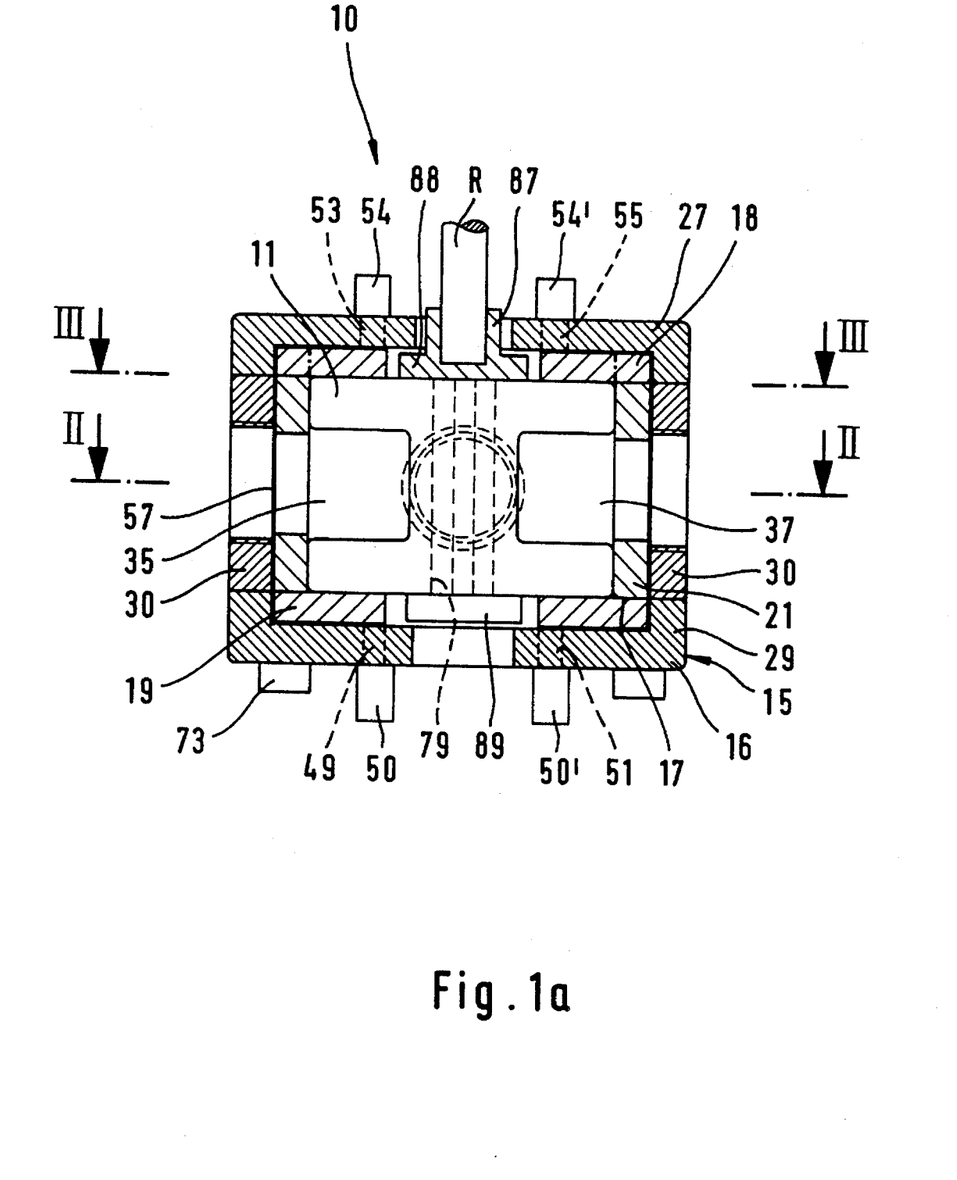
FIG. 1a a cross-section through the rotary slide valve according to the invention, FIG. 1b a diagrammatic view of an apparatus for the oxygen enrichment of air using the rotary slide valve according to the invention, FIG. 1c an additional preferred apparatus for the oxygen enrichment of air using an additional embodiment of the rotary slide valve according to the invention, FIG. 2a to 2d cross-sectional views along line II—II in FIG. 1a in which there is shown the control of compressed air and nitrogen flows in four consecutive operating positions of a slide valve body, FIG. 3a to 3h cross-sectional views taken along line III—III in FIG. 1a in which there is shown the control of compressed air and nitrogen flows and of flows of oxygen enriched air in eight consecutive operating positions, FIG. 4 as an additional embodiment a top view of the rotary slide valve according to the invention with a crank drive and FIG. 5 a cross-sectional view along line V—V in FIG. 4.

FIG. 1a shows a rotary slide valve 10 which consists in essence of a cylindrical slide valve body 11 which is located inside a ring-shaped housing 15, and a rotary drive R. Of rotary drive R only a motor shaft is shown. The housing 15 has an outer housing 16 and an inner housing 17. The inner housing 17 surrounds the slide valve body 11 and encompasses a slide bearing bushing 21 as well as an upper and a lower slide bearing sleeve 18 or 19 respectively whose end faces adjoin the slide bearing bushing 21. Thus the slide valve body 11 is confined in the axial and radial direction by the inner housing 17, with the slide valve body 11 having slight axial and radial play relative to the inner housing 17. The slide bearing sleeves 18, 19 are urged by the outer housing 16, against the slide bearing bushing 21 and are thereby held in place. The outer housing 16 consists of an upper and lower lid 27 and 29 respectively and an annular casing 30 which lies between them and radially adjoins the slide bearing bushing 21. By means of several screws 73 the upper lid 27 is urged axially against the lower lid 29 in such manner that the slide bearing sleeves 18, 19 are also held in place. The slide valve body 11, the upper and lower slide bearing sleeve 18, 19, as well as the slide bearing bushing 21 are each made of ceramic material. The use of ceramic parts has the advantage that the tightest possible seal is obtained between the parts which slide against each other, combined with a very low coefficient of friction, especially with regard to the separation of the ducts for the oxygen from those for the compressed air and nitrogen, respectively. The upper and lower lid 27, 29 and the annular casing 30 are made of metal. Because of the different coefficients of temperature expansion of ceramic and metal, the inner housing 17 would expand differently than the outer housing 16 during temperature changes and, if too little radial play existed between outer and inner housings 16, 17, the ceramic parts would crack. To eliminate the danger of cracking an elastic seal 57 is provided between the slide bearing bushing 21 and the annular sleeve 30, as well as between the upper and lower slide bearing sleeve 18 or 19 and the upper and lower lid 27, 29, which compensates for different changes in length of the various parts during temperature changes. The housing 15 has four radial openings, which are more readily seen in FIG. 2 and are further described in what follows. The slide valve body 11 has a central location hole 79, as well as, in its peripheral surface, two oppositely located groove-like recesses 35 and 37 which are positioned in housing 15 at the same axial level as radial openings which will be described in more detail. The slide valve body 11 is connected to the rotary drive R through a rotary coupling 87. The rotary coupling 87 has an upper shaft and one which extends through the central location hole 79 and whose lower end is threaded and has a nut 89 screwed on. The nut 89 bears against a lower end face of the slide valve body 11 and a shoulder 88 of rotary coupling 87 bears against an upper end face of the slide valve body 11. By tightening nut 89, the slide valve body 11 is pressed against the shoulder 88 and thus axially fixed in position. The rotary coupling 87 has an axial bore into which the motor shaft of the rotary drive R is pressed. In the lower lid 29 there are provided four oxygen inlet connections, of which only two, namely only the oxygen inlet connections 50 and 50' are shown. The oxygen inlet connections 50, 50' are in communication, respectively, with two oxygen inlet openings 49 and 51 in housing 15 of which only one is shown in each case. The upper lid 27 has two oxygen outlet connections 54, 54' which are in communication, respectively, with two oxygen outlet openings 53 and 55 respectively in housing 15, of which only one is shown in each case.

Figure 1B:
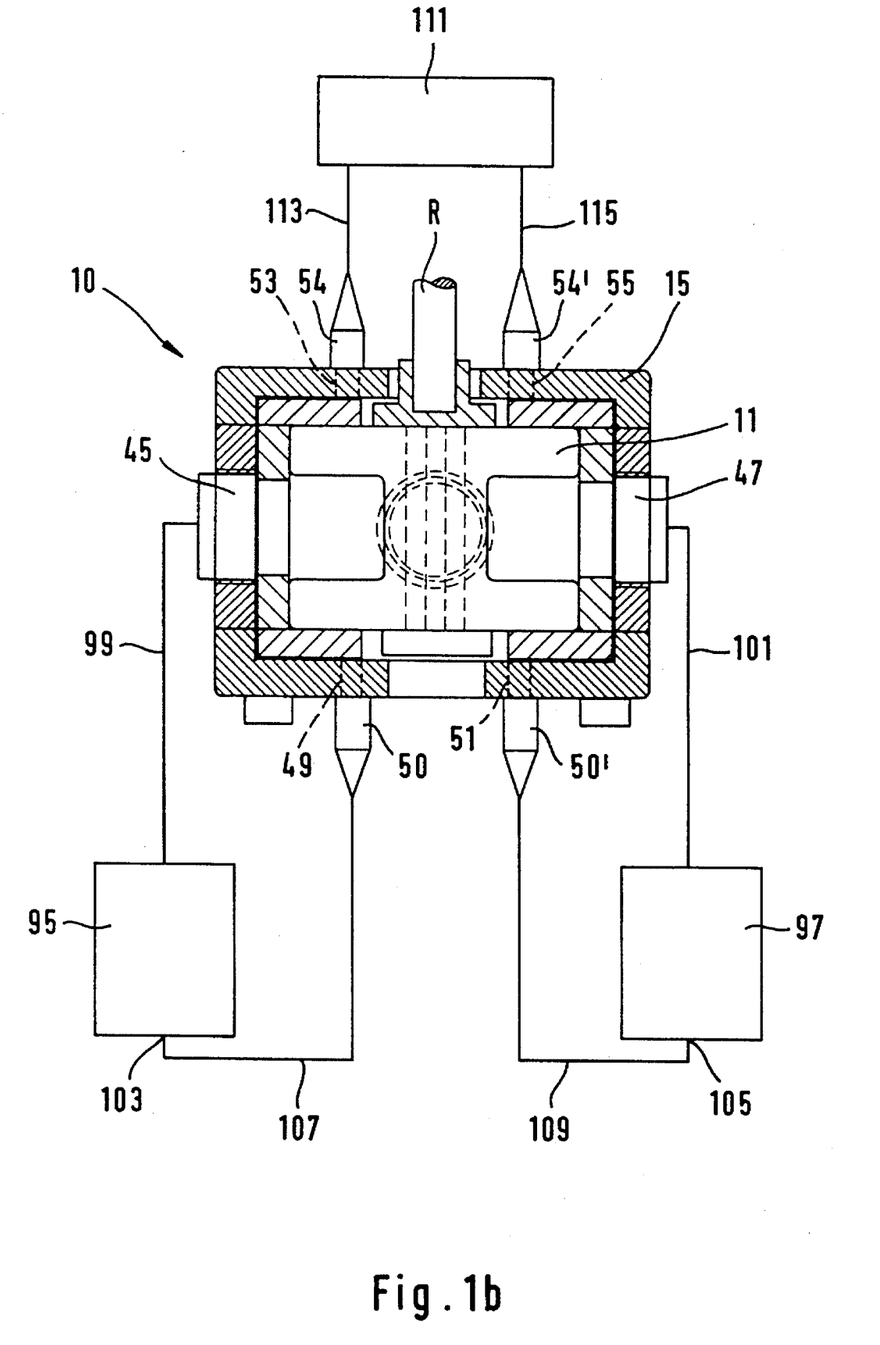

The rotary slide valve 10 shown in FIG. 1a is built into an apparatus for the oxygen enrichment of air, as is diagrammatically shown in FIG. 1b. The reference numerals used in FIG. 1a are also similarly used in FIG. 1b, as necessary. The apparatus for the oxygen enrichment of air consists in essence of the rotary slide valve 10, a first and a second container 95, 97 which are both filled with a zeolite fixed bed and an oxygen storage vessel 111 for oxygen enriched air. The first container 95 is connected through a duct 99 to a radial compressed air outlet opening 45 in housing 15 of rotary slide valve 10. The compressed air outlet opening 45 also serves as nitrogen inlet opening, as is explained in more detail in what follows. The first container 95 has in its bottom a container outlet 103 for oxygen enriched air, which is referred to in what follows for short as container outlet 103 for oxygen. Because the apparatus shown in FIG. 1b enriches air so strongly with oxygen that the oxygen enriched air consists almost entirely of oxygen, in what follows there is spoken, for simplicity, of oxygen rather than of oxygen enriched air. The container outlet 103 for oxygen is connected by a duct 107 to the first oxygen inlet connection 50 of rotary slide valve 10. The oxygen outlet connection 54 of the rotary slide valve 10 is connected by a duct 113 to the oxygen storage vessel 111. The second container 97 is again connected by a duct 101 to an additional compressed air outlet opening 47 in housing 15. The additional compressed air outlet opening 47 is also in the form of a radial bore and is located directly opposite the compressed air outlet opening 45. A container outlet 105 for oxygen from the second container 97 is connected by duct 109 to a second oxygen inlet connection 50' and the second oxygen outlet connection 54' is connected by a duct 115 to the oxygen storage vessel 111. Thus the apparatus is configured symmetrically with respect to the two containers 95, 97.

In FIG. 2a to 2d there are shown the slide valve body 11 and the slide bearing bushing 21. There, the slide valve body 11 is shown in four consecutive angular positions. All of the parts which have already been discussed in the preceding figures bear the previously indicated reference numerals. The slide bearing bushing 21 has, in addition to the compressed air outlets 45 and 47, a compressed air inlet opening 39 and a nitrogen outlet opening 41 which take the form of radial bores located diametrically opposite each other in pairs and which also extend correspondingly through the outer housing 16. The compressed air inlet opening 39 and the nitrogen outlet opening 41 are displaced by an angle of approximately 90° relative to the compressed air outlet openings 45, 47. The slide valve body 11 is cylindrically shaped and has, as has already been explained with reference to FIG. 1, two recesses 35, 37 and a web-shaped portion 25 lying between them. On its circumferential face the slide valve body 11 has two diametrically opposed control surfaces 31, 33. In the web-shaped portion 25 there is provided a recess 23 in the form of a bore which extends axially through the slide valve body 11, and which is located radially between the central location hole 79 and the control surface 31. Each of the compressed air inlet opening 39 and the nitrogen outlet opening 41 preferably has a cross-section which is smaller than the respective compressed air outlet openings 45, 47, in order to achieve a more rapid pressure reduction in the container which is to be desorbed, as more fully explained below. However, it is also possible to make the compressed air outlet openings 45, 47 as large as the compressed air inlet- and the nitrogen outlet opening 39 and 41, respectively. On the other hand, the control surfaces 31, 33 are made so large that in a first closure position shown in FIG. 2b, they completely close off the compressed air inlet opening 39 and the nitrogen outlet opening 31, as well as completely closing off the compressed air outlet openings 45, 47 in a second closure position shown in FIG. 2d. Thus, different flow connections between the openings are obtained, depending upon the position of the slide valve body 11.

In FIG. 3a to 3h there are shown eight consecutive operating positions of the slide valve body 11, the previously applied reference characters being also retained in these figures. FIG. 3a to 3h differ from FIG. 2a to 2d in that there is shown not only the positioning of the slide valve body 11 relative to the slide bearing bushing 21 but also the positioning of the slide valve body 11 relative to the upper slide bearing sleeve 18. The annular casing 30 is also shown in FIG. 3a to 3h. The upper slide bearing sleeve 18 has two pairs of axially opposed, annular-shaped grooves, with all the grooves lying in a common arc of a circle. The radius of the arc of a circle corresponds to the spacing of recess 23 from the central axis of the location hole 79 of slide valve body 11, so that the recess 23 depending on its positioning is connected to a particular groove. Each groove 53a and 53b is connected to both oxygen outlet openings 53 in the upper lid 27. Not explicitly shown is that the oxygen outlet openings 53 are collectively connected to the common oxygen outlet connection 54. The grooves 55a and 55b which, like the grooves 53a and 53b, are diametrically opposed, are connected to both oxygen outlet openings 55 which again are collectively connected to a common oxygen outlet connection 54. The lower slide bearing sleeve 19 corresponds to the upper slide bearing sleeve 18 in its shape and location in housing 15, so that the grooves 53a, 53b, 55a and 55b have corresponding axially opposed grooves in the lower slide bearing sleeve 19 and are connected to each other upon appropriate positioning of the recess 23. The grooves in the lower slide bearing sleeve 19 are connected in pairs to the oxygen inlet openings 49 or the oxygen outlet openings 51. Moreover it is also possible to configure the upper and lower lid 27, 29 with only two adjacent grooves. However, the circumferential spacing of the grooves must always be at least as great as the width of recess 23 in slide valve body 11, in order to prevent the recess 23 from being connected simultaneously to two grooves. The rotary drive R is connected in the embodiment shown in FIG. 1 to 3 to the slide valve body 11 via rotary coupling 87.

Figure 4:
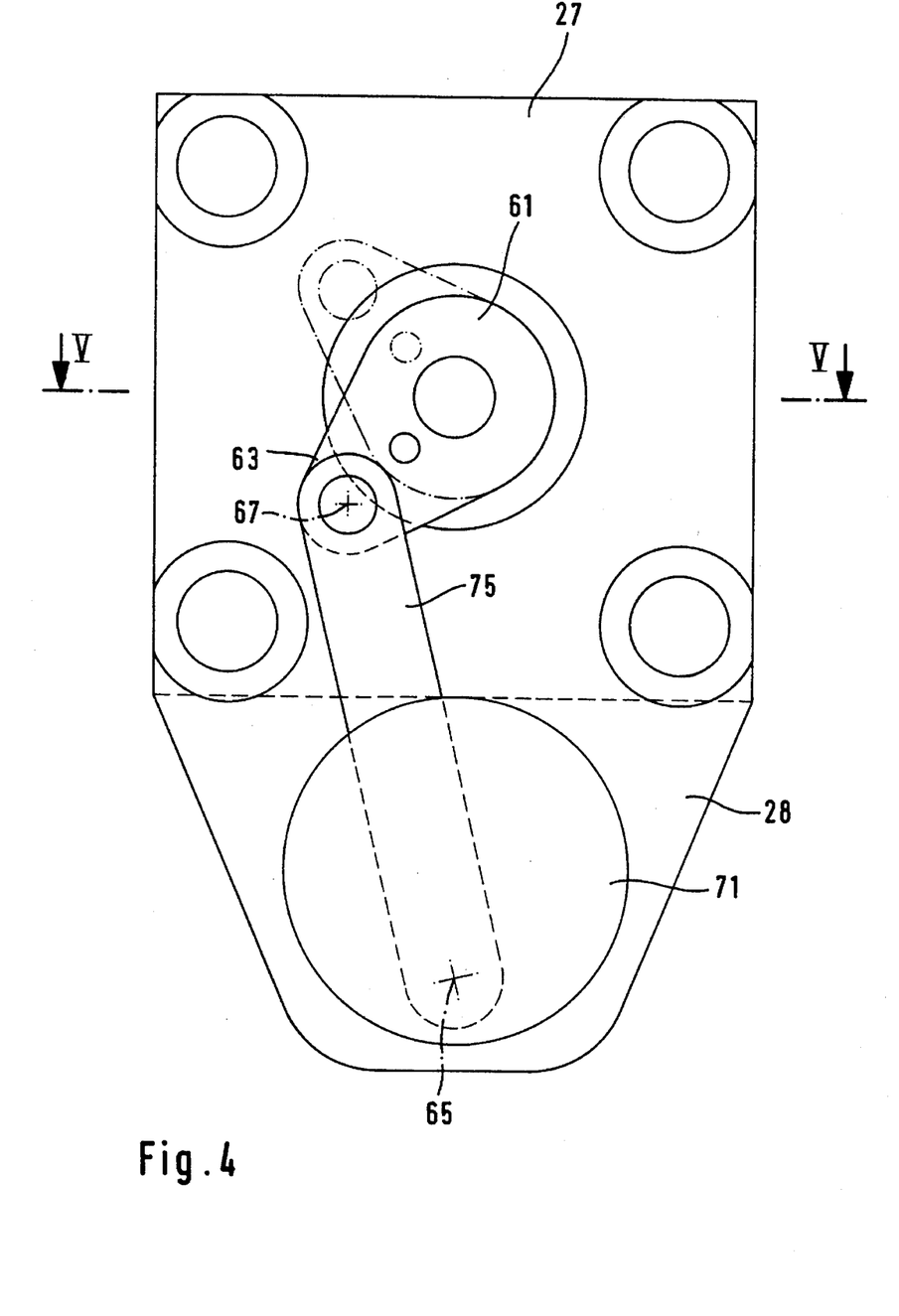
Figure 5:
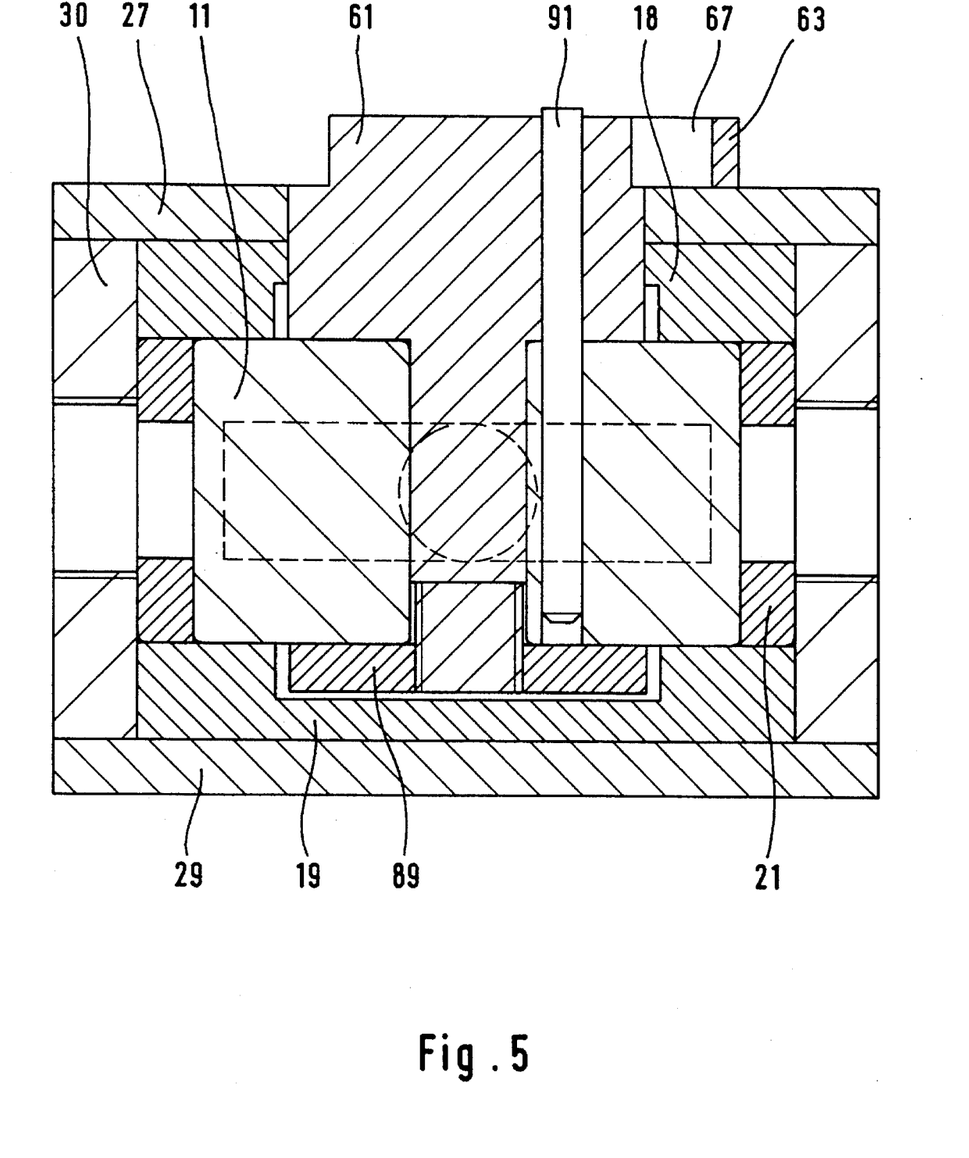

In the second embodiment shown in FIG. 4 and 5 the rotary drive R takes the form of a crank drive. The upper lid 27 has a laterally projecting side portion 28 to which the rotary drive R (not shown in FIG. 4) is attached and which sets a disk 71 into motion. A crank arm 75 is rotatable about a hinge point 65 but is attached to disk 71 eccentrically, the eccentricity being adjustable by means of a slotted hole in disk 71. The crank arm 75 is further rotatably connected via hinge point 67 to rotary coupling 61 which has a projecting crank portion 63. The crank drive imparts to the slide valve body 11 a reversing 90° oscillating movement. The angle of the oscillating movement is adjustable by means of the lengthwise adjustable crank arm 75, its two extreme positions being shown in FIG. 4. In FIG. 5 the connection between the slide valve body 11 and the rotary coupling 61 can be seen more clearly, with the reference numerals utilized in FIG. 1 to 3 being used again for corresponding elements in FIG. 5. As previously explained, a radial press fit between rotary coupling 61 and the central location hole 79 cannot be used because the slide valve body 11 is made of ceramic material. Therefore the attachment of the slide valve body 11 to the rotary coupling 61 takes place in this embodiment, too, by means of axial clamping. To prevent additional rotation between the slide valve body 11 and the rotary coupling 61, a dowel pin 91 is provided, which engages a matching bore in the crank portion 63. The lower slide bearing sleeve 19, in contrast to the embodiment shown in FIG. 1a, does not have a central bore which extends all the way through, but only a hollow, which facilitates sealing of the slide bearing sleeve 19 against the lower lid 29.

Figure 2A:
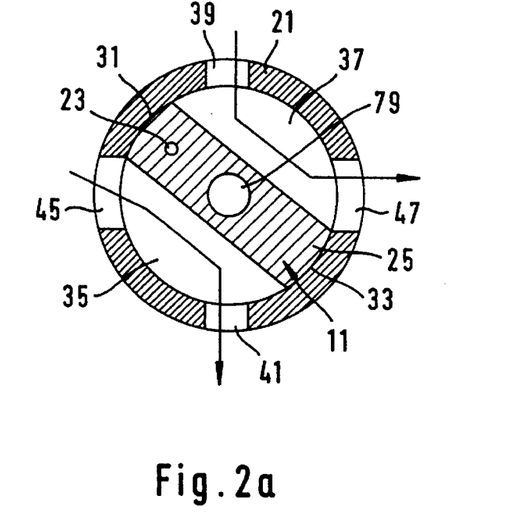
Figure 3A:
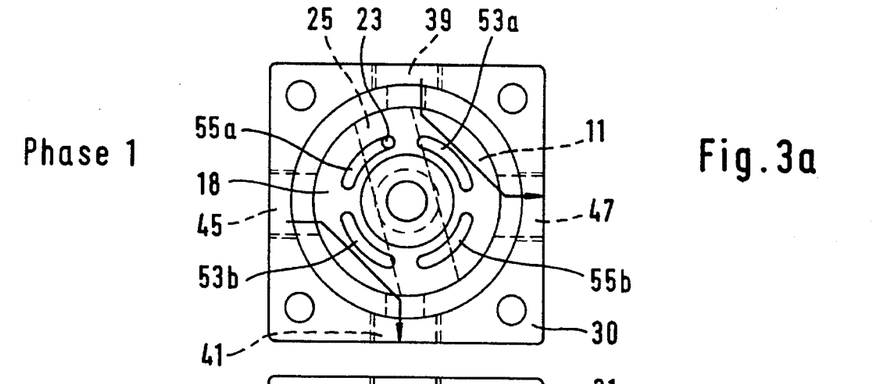

The operation of the first embodiment of the rotary slide valve will now be described more fully, with reference to FIG. 1a to 3h. Depending upon the position of the slide valve body 11, there take place for each rotation of the slide valve body 11 eight different, consecutive operating phases. Phase 1 is shown in FIG. 2a and 3a, in it the slide valve body 11 is so positioned that compressed air from a compressed air source can flow through the compressed air inlet opening 39 into the recess 37 and from there into the second container 97 through the compressed air outlet opening 47 and the duct 101. Starting from a predetermined pressure in the second container 97, there starts a so-called adsorption phase in container 97, in which the nitrogen present in the air is adsorbed by the zeolite fixed bed. The predetermined pressure normally lies between 2 and 3 bar. Since, after adsorption of the nitrogen, the air consists predominantly of oxygen, in what follows there is again spoken for simplicity only of oxygen. The oxygen leaves the second container 97 at a container outlet for oxygen 105 and flows through a duct 109, the oxygen inlet connection 50', the oxygen inlet opening 51 into the grooves in the lower slide bearing sleeve 19, which correspond to the grooves 55a and 55b in the upper slide bearing sleeve 18. As can be seen in FIG. 3a, in phase 1 the recess 23 is connected to groove 55a so that the oxygen can flow into the oxygen storage vessel 111 through the recess 23, through the slide valve body 11, through the groove 55a, the oxygen outlet opening 55, the oxygen outlet connection 54' and the duct 115.

Figure 2B:
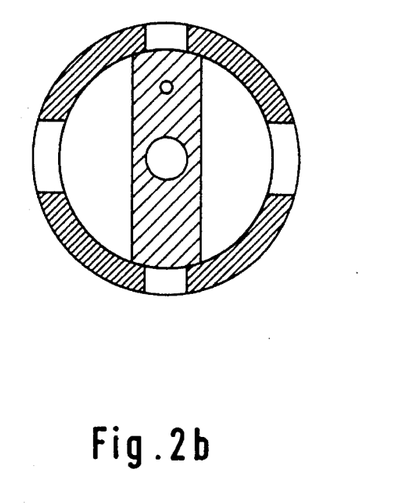
Figure 3B:
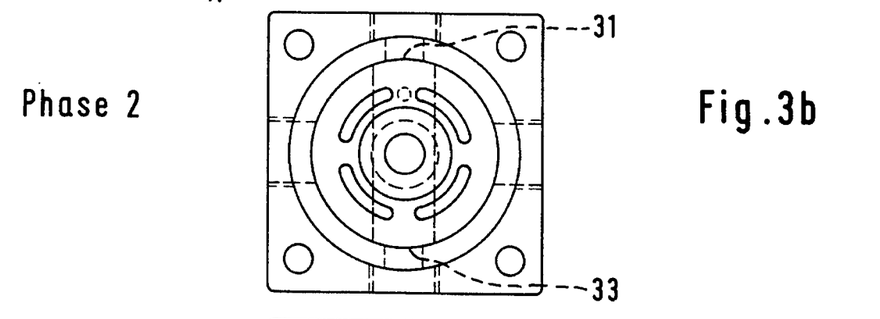

The rotary drive R moves the slide valve body 11 onward into phase 2, shown in FIG. 2b and 3b. In this phase, the slide valve body 11 is positioned so that the control surfaces 31 and 33 completely close the compressed air inlet opening 39 and the nitrogen outlet opening 41, respectively, so that no gas flows take place. As soon as the slide valve body 11 is rotated further, the compressed air inlet opening 39 and the nitrogen outlet opening 41 are no longer completely closed and phase 3 begins. In this phase, the compressed air flows through the compressed air inlet opening 39 and through recess 35 into the compressed air outlet opening 45 and through duct 99 into the first container 95. In the first container 95 there then begins the adsorption phase. The oxygen which is produced leaves the first container 95 through the container outlet for oxygen 103 and flows through duct 107, the oxygen inlet connection 50 to oxygen inlet opening 49 and flows into the grooves in the lower slide bearing sleeve 19 which are located axially opposite to the grooves 53a and 53b in the upper slide bearing sleeve 18.

Figure 3C:
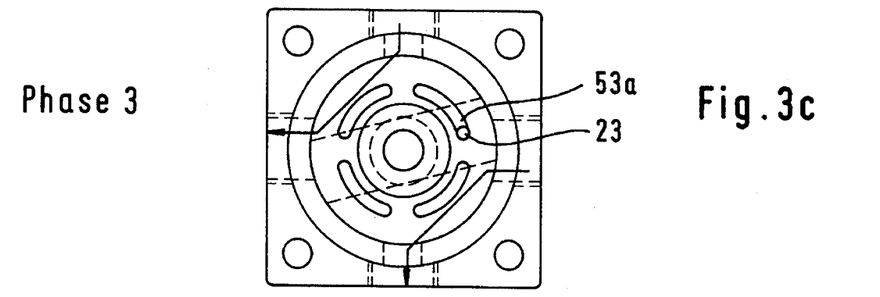
Figure 3D:
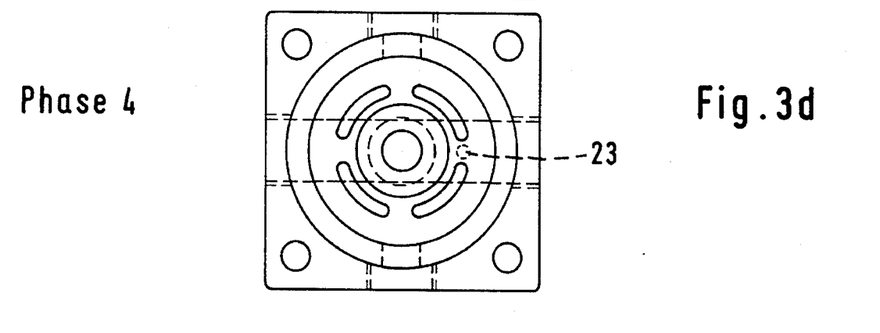

In phase 3 the recess 23 is adjacent to groove 53a, as can be seen in FIG. 3c, so that the oxygen flows into the oxygen storage vessel 111 through the recess 23, the groove 53a, the oxygen outlet opening 53, into oxygen outlet connection 54 and ultimately through duct 113. While the adsorption phase described immediately above takes place in the first container 95, a desorption phase takes place simultaneously in the second container 97. At the end of the adsorption phase of the second container 97 (phase 1) the rotary slide valve interrupted nearly simultaneously the compressed air supply to the second container 97 and the oxygen output in phase 2. Thus the second container 97 was under internal overpressure. In phase 3 this overpressure is suddenly relieved by opening of the nitrogen outlet 41. In phase 3, the second container 97 and its associated compressed air outlet opening 47 are connected to the nitrogen outlet opening 47 through recess 37, so that there occurs a pressure reduction by which the nitrogen molecules deposited on the zeolite fixed bed of container 97 are liberated. The liberated nitrogen can therefore flow out of the second container 97 and out of the rotary slide valve 10. During this desorption phase the rotary slide valve 10 closes off the connection between ducts 115 and 109, so that the sudden pressure reduction does not allow oxygen from the oxygen storage vessel 111 back into container 97. Previously known check valves, which prevent a return flow of oxygen into the container are therefore superfluous.

In phase 4, the slide valve body 11 has reached a second closing-off position, in which the control surfaces 31 and 33 completely confront the compressed air outlet openings 47 and 45, respectively, and close same, so that a rest phase occurs.

Figure 3E:
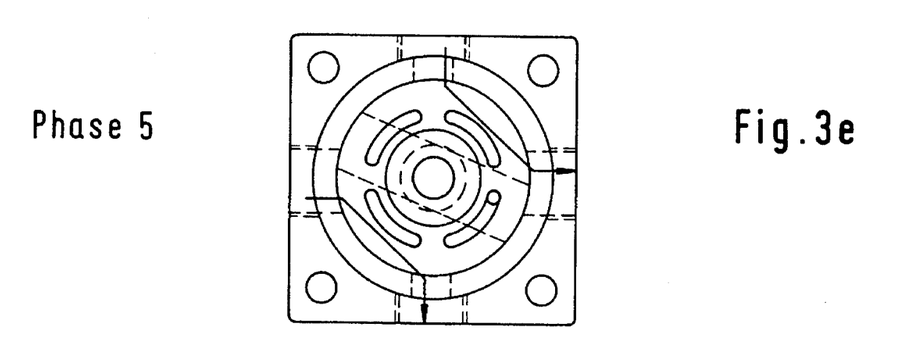
Figure 3F:
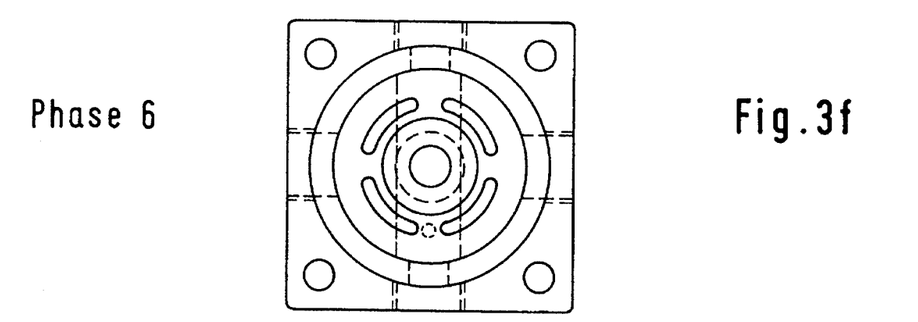
Figure 3G:
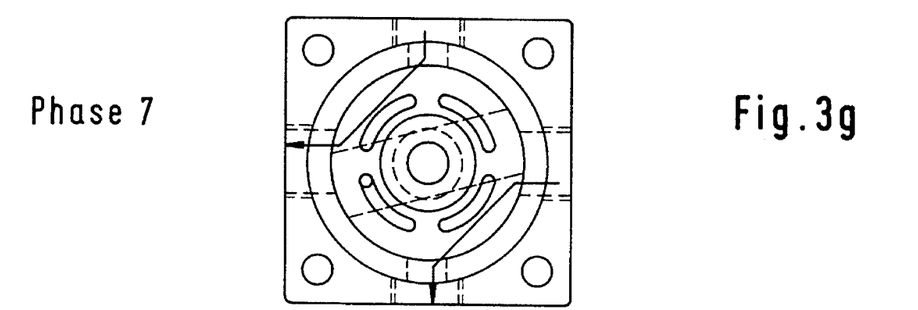
Figure 3H:
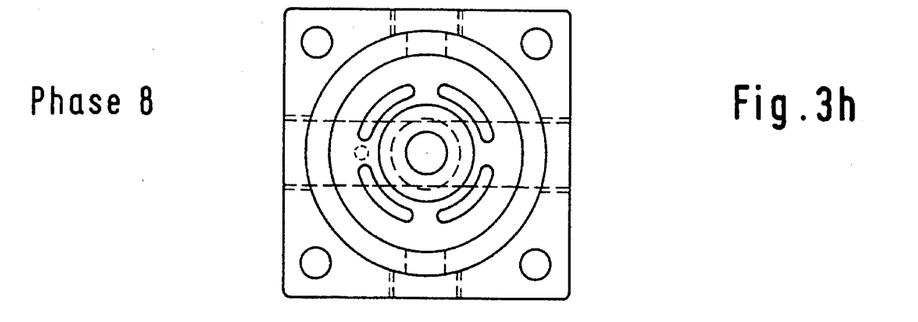

Phase 5, which is shown in FIG. 3e, corresponds essentially to phase 1. The second container 97 adsorbs nitrogen and thereby produces oxygen, while the first container 95 is desorbed. However, unlike in phase 1, the produced oxygen does not flow through the groove 55a and its corresponding axially opposed groove, but through the groove 55b and the latter's axially opposed groove into the oxygen storage vessel 111.

Phases 6, 7 and 8 correspond to the previously described phases 2, 3 and 4, respectively.

In phase 6 the slide valve body 11 is again in the first closed-off position. In phase 7 the first container 95 adsorbs nitrogen and produces oxygen, while the second container 97 is desorbed and in phase 8 the slide valve body 11 is in the second closed-off position.

During a complete rotation of slide valve body 11 each container 95 and 97 goes through two adsorption, two desorption and four rest phases.

Figure 1C:
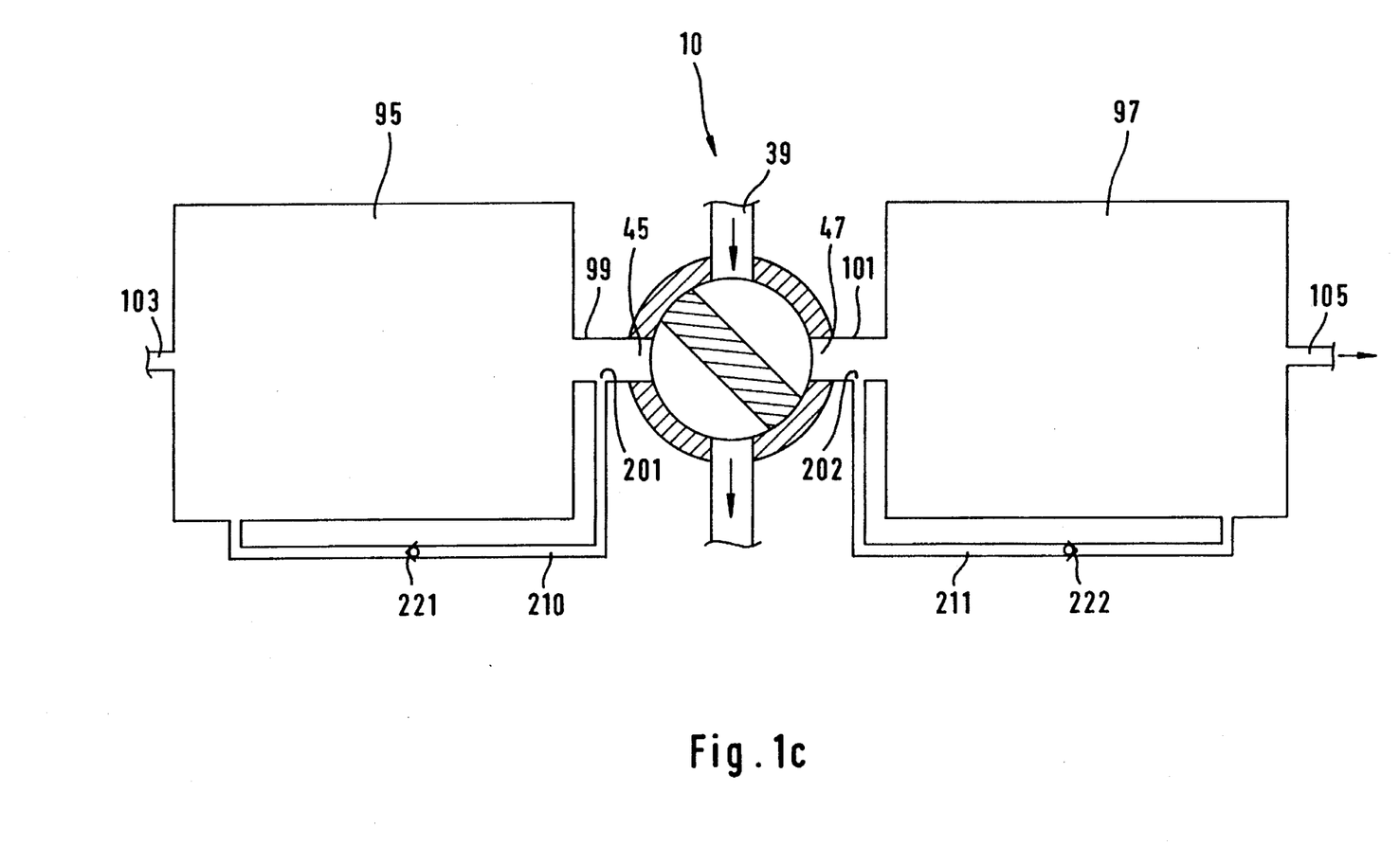

To enhance the efficiency of the apparatus equipped with the rotary slide valve 10 for oxygen enrichment, the alternative shown in FIG. 1c may be used. In the ducts 99 and 101 leading to the two containers 95 and 97, respectively, there are located near the two compressed air outlet openings 45 and 47 two additional outlets 201 and 202, respectively. The two outlets 201 and 202 are connected through low pressure ducts 210 and 211 to the two containers 95 and 97, respectively. In so doing the low pressure ducts 210 and 211 open into regions of containers 95 and 97, respectively, which are located in the vicinity of the container outlets 103 and 105 respectively and as far away as possible from the inlet ends of ducts 99 and 101 into container 95 and 97, respectively, and which are therefore at a disadvantage during desorption.

In the adsorption phase of containers 95 and 97, compressed air flow through the low pressure duct 210 and 211, respectively, is prevented by check valve 221 and 222, respectively, positioned in these low pressure ducts 210 and 211. In the desorption phase of containers 95 and 97, the high flow velocity of the nitrogen flowing out through duct 99 and 101, respectively, creates through the Venturi effect a relatively low pressure in the low pressure ducts 210 and 211, respectively, which causes desorption of nitrogen in those portions of containers 95 and 97 which are otherwise at a disadvantage with respect to desorption.

Through this improved and more complete desorption of nitrogen, one can omit using a part of the produced oxygen for scavenging during the desorption phase and the yield of oxygen enriched air can be enhanced. It is possible to omit the grooves 53a and 55a (see FIG. 3a–3d) as well as their axially opposed grooves, whereby an extended rest phase is obtained. By changing the circumferential length of the grooves, or by changing the rate of rotation of the rotary drive R, the timing of the various phases can be adjusted.

In case more than two containers operate alternately, there have to be provided correspondingly more compressed air inlet-nitrogen outlet-compressed air outlet-nitrogen inlet- and nitrogen outlet openings. Preferably there should be provided one compressed air inlet opening between two compressed air outlet openings and also one nitrogen outlet opening between two compressed air outlet openings. For more than two containers, the slide valve body 11 could also have a star-shaped central portion 30, as well as several recesses 23 which are connected to grooves of different arc-of-a-circle diameters.

Figure 2C:
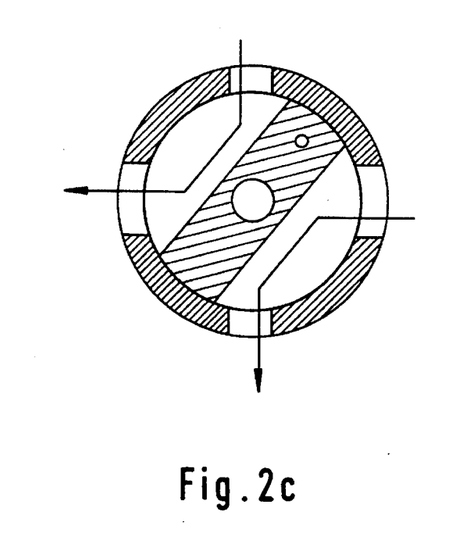
Figure 2D:
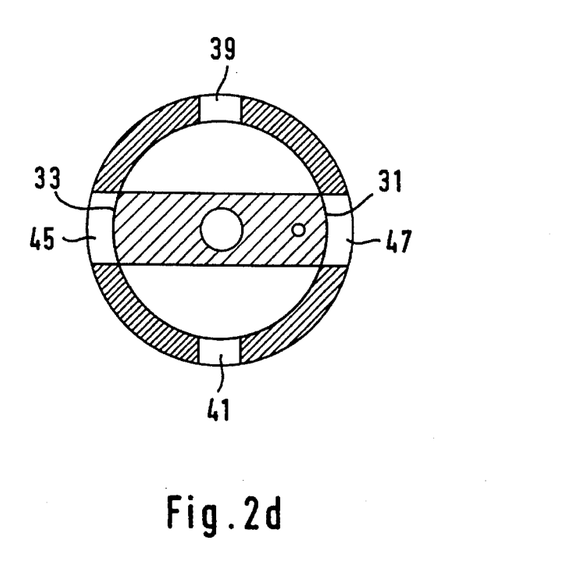

In the embodiment shown in FIG. 4 and 5 the slide valve body 11 is not rotated continuously, but is only reversibly oscillated through 90° by the crank device between two extreme positions, namely that of phase 1 (FIG. 2a, 3a) and phase 3 (FIG. 2c, 3c). In neither phase are the grooves 53b and 55b, as well as their corresponding axially opposed grooves connected to the recess 23 and they are therefore superfluous. The construction of the rotary drive R as a crank drive is advantageous when scavenging phases are not necessary, i.e. when the zeolite fixed beds are sufficiently desorbed during the desorption phase. Because the scavenging phase is omitted with a crank drive, the adsorption and desorption phases preferably last longer, which leads to a higher yield of produced oxygen.

Since the rotary slide valve 10 has separate outlet and inlet openings for all of the gas flows which take place, it controls these gas flows independently of each other. It is therefore also impossible for that desorbed nitrogen to get into the oxygen ducts 107, 109, 113 and 115, which would lower the purity of the produced oxygen.

We claim:

1. A rotary slide valve for controlling compressed air, nitrogen and oxygen flows, having a) a housing having at least one compressed air inlet opening, at least two compressed air outlet openings, which also serve as nitrogen inlet openings, at least one nitrogen outlet opening and oxygen flow openings, b) a slide valve body positioned rotatably within the housing having recesses in the peripheral surface for the control of gas flows, c) a rotary drive connected to the slide valve body, and d) a recess in the slide valve body for conducting oxygen through which the oxygen flow openings are adapted to be connected to each other, characterized in that the oxygen flow openings include at least two openings serving exclusively as oxygen inlet openings and at least two associated openings serving exclusively as oxygen outlet openings, the oxygen inlet openings and the oxygen outlet openings are located respectively in opposed pairs in axially opposed end surface housing portions, so that each oxygen inlet opening is adapted to be connected through a recess to its associated, axially opposed oxygen outlet opening, and the compressed air inlet opening and the nitrogen outlet opening on the one hand, and the compressed air outlet openings on the other hand are configured exclusively as radially diametrically opposed bores, which cooperate with diametrically opposed control surfaces and recesses present in the peripheral surface of the slide valve body.

2. A rotary slide valve according to claim 1 characterized in that the recess for conducting oxygen is an axial bore.

3. A rotary slide valve according to claim 2, characterized in that the compressed air inlet opening and the nitrogen outlet opening are each smaller than the compressed air outlet openings and that the control surfaces are made so large that, in a first closed off position, the compressed air inlet opening and the nitrogen outlet opening and, in a second closed-off position, the compressed air outlet openings are each adapted to be completely closed off from the compressed air inlet and nitrogen outlet opening by means of the slide valve body.

4. A rotary slide valve according to claim 3, characterized in that the rotary drive takes the form of a crank drive whose connecting rod is so connected to the slide valve body that the latter is rotatable only within a range in which the second closed-off position is not attained.

5. A rotary slide valve according to claim 4 characterized in that both the magnitude of the range of rotation as well as the rotary position of the slide valve body is adjustable relative to the crank drive.

6. A rotary slide valve according to claim 5, characterized in that the crank drive has adjustable hinge points for adjusting the range and the rotational position of the slide valve body.

7. A rotary slide valve according to claim 1, characterized in that the compressed air inlet opening and the nitrogen outlet opening are located angularly displaced relative to the compressed air outlet openings.

8. A rotary slide valve according to claim 7 characterized in that the angularly displaced openings are displaced by an angle which amounts to 90°.

9. A rotary slide valve according to claim 1, characterized in that the oxygen inlet openings and the oxygen outlet openings take the form respectively of axially opposed circularly curved grooves in the axially opposed housing portions.

10. A rotary slide valve according to claim 9, characterized in that the respective grooves are located in a common arc of a circle.

11. A rotary slide valve according to claim 10, characterized in that the grooves formed in a common portion of the housing are arranged in pairs and diametrically opposed.

12. A rotary slide valve according to claim 9, characterized in that the grooves in each housing portion have a circumferential spacing from each other which is at least as great as the width of the recess for conducting oxygen in the slide valve body.

13. A rotary slide valve according to claim 1, characterized in that the housing consists of an outer and inner housing and that the inner housing consists of an upper and lower slide bearing sleeve as well as a slide bearing bushing.

14. A rotary slide valve according to claim 13, characterized in that the inner housing and the slide valve body are made of ceramic material.

15. A rotary slide valve according to claim 13, characterized in that an elastic seal is provided between the outer and the inner housing.

16. A rotary slide valve according to claim 1 in combination with apparatus for the oxygen enrichment of air through selective adsorption of air components, the apparatus having at least two alternately operating containers filled with adsorption material and having an oxygen storage vessel, the rotary slide valve being so connected to the apparatus that a) the compressed air inlet opening is connected to a source of compressed air, b) the compressed air outlet openings are connected respectively to a container, c) each container has a container outlet which is connected to one of the oxygen openings serving as oxygen inlet openings, characterized in that the openings which serve exclusively as oxygen inlet openings are connected to the container outlets and that the openings which serve exclusively as oxygen outlet openings are connected to the oxygen storage vessel.

17. The combination according to claim 16 characterized in that for each container there is provided a low pressure duct which opens at one end near the compressed air outlet openings into the ducts that connect the compressed air outlet openings to the containers and opens at the other end into the containers at locations which are far removed from the inlets of the ducts into the containers, and that at least one check valve is located in each low pressure duct.

* * * * *

UNITED STATES PATENT AND TRADEMARK OFFICE
CERTIFICATE OF CORRECTION

PATENT NO. : 5,584,322
DATED : December 17, 1996
INVENTOR(S) : Günter Pöschl and Detlev Degenhardt It is certified that error appears in the above-identified patent and that said Letters Patent is hereby corrected as shown below:

On cover page, item "[73] Assignee", below "Switzerland" insert ---Drägerwerk AG, Lübeck, Germany---.

Signed and Sealed this

Fifteenth Day of July, 1997

*Attest:*

BRUCE LEHMAN

*Attesting Officer*     *Commissioner of Patents and Trademarks*